(12) United States Patent
Kent, Jr.

(10) Patent No.: US 12,462,461 B1
(45) Date of Patent: Nov. 4, 2025

(54) SYSTEM AND METHOD FOR AN INTERACTIVE EXPERIENCE

(71) Applicant: Joseph E. Kent, Jr., North Hollywood, CA (US)

(72) Inventor: Joseph E. Kent, Jr., North Hollywood, CA (US)

( * ) Notice: Subject to any disclaimer, the term of this patent is extended or adjusted under 35 U.S.C. 154(b) by 0 days.

(21) Appl. No.: 19/076,768

(22) Filed: Mar. 11, 2025

Related U.S. Application Data

(60) Provisional application No. 63/720,433, filed on Nov. 14, 2024, provisional application No. 63/691,713, filed on Sep. 6, 2024.

(51) Int. Cl.
| | | |
|---|---|---|
| *G06T 19/00* | (2011.01) | |
| *G06F 16/44* | (2019.01) | |
| *G06T 5/50* | (2006.01) | |
| *G06T 13/40* | (2011.01) | |
| *H04W 4/021* | (2018.01) | |

(52) U.S. Cl.
CPC ............ *G06T 13/40* (2013.01); *G06F 16/444* (2019.01); *G06T 5/50* (2013.01); *G06T 19/006* (2013.01); *H04W 4/021* (2013.01); *G06T 2207/30196* (2013.01); *G06T 2219/2016* (2013.01)

(58) Field of Classification Search
None
See application file for complete search history.

(56) References Cited

U.S. PATENT DOCUMENTS

| | | |
|---|---|---|
| 6,917,301 B2 | 7/2005 | Blum et al. |
| 7,009,523 B2 | 3/2006 | Blum et al. |
| 7,316,519 B2 | 1/2008 | Ryman et al. |
| 7,490,941 B2 | 2/2009 | Mintz et al. |
| 8,250,795 B2 | 8/2012 | Barbieri et al. |
| 9,233,294 B1 | 1/2016 | Coyle |
| 9,317,133 B2 | 4/2016 | Korah et al. |
| 10,191,364 B2 | 1/2019 | Christensen |
| D879,057 S | 3/2020 | Schmelling |
| 10,755,612 B1 | 8/2020 | Bastiyali |
| 11,067,826 B2 | 7/2021 | Shinohara et al. |
| 11,966,506 B1 | 4/2024 | Tsai |
| 2006/0130378 A1 | 6/2006 | Rybalov |
| 2006/0171008 A1 | 8/2006 | Mintz et al. |
| 2011/0002038 A1 | 1/2011 | Wang |

(Continued)

FOREIGN PATENT DOCUMENTS

| | | |
|---|---|---|
| CN | 108534791 A | 9/2018 |
| KR | 20240005457 A | 1/2024 |

(Continued)

OTHER PUBLICATIONS

Ferzli et al., "Mobile Cloud Computing Educational Tool for Image/Video Processing Algorithms", IEEE, 2011. (Year: 2011).*

(Continued)

*Primary Examiner* — Nicholas R Wilson
(74) *Attorney, Agent, or Firm* — Bold IP, PLLC; Christopher Mayle

(57) ABSTRACT

A system and method for determining that a user is within a predetermined distance of a designated physical location associated with a celebrity such as a Hollywood star whereby the system may activate an interactive session having a real-time and an artificial intelligence depiction of the celebrity.

8 Claims, 6 Drawing Sheets

(56) References Cited

U.S. PATENT DOCUMENTS

| | | | |
|---|---|---|---|
| 2013/0050260 A1* | 2/2013 | Reitan | G06T 19/006 |
| | | | 345/633 |
| 2015/0185897 A1 | 7/2015 | Bauer | |
| 2017/0337722 A1 | 11/2017 | Sullivan et al. | |
| 2023/0401632 A1* | 12/2023 | Cardelino | G06V 20/64 |

FOREIGN PATENT DOCUMENTS

| | | | |
|---|---|---|---|
| WO | 2005099386 A2 | 10/2005 | |
| WO | 2018154458 A1 | 8/2018 | |
| WO | 2018175683 A1 | 9/2018 | |

OTHER PUBLICATIONS

International Search Report in counterpart application Serial No. PCT/US2025/023202, with a mailing date of Jun. 30, 2025 and consisting of 13 pages.

* cited by examiner

SYSTEM AND METHOD FOR AN INTERACTIVE EXPERIENCE

CROSS REFERENCE TO RELATED APPLICATIONS

This application claims priority to U.S. Provisional Patent Application No. 63/691,713 filed Sep. 6, 2024 and U.S. Provisional Patent Application No. 63/720,433 filed Nov. 14, 2024.

FIELD OF THE DISCLOSURE

The overall invention is an interactive system and more particularly an improved experience for the Hollywood Walk of Fame or other attractions by providing an interactive application controlled via a computing device application.

BACKGROUND

In today's fast-paced digital age, the significance of personalized experiences, especially in the realm of self-help and medical support, has become paramount. Envisaging a solution that bridges personal aspirations with technology, the inventor has conceptualized a system that combines deep fake technology, artificial intelligence, and various health monitoring parameters. This application aims to assist and uplift individuals facing challenges ranging from medical conditions and personal goals to athletic pursuits. There are many attractions in the world dedicated to honoring individuals. For instance, the Hollywood Walk of Fame is a famous landmark and tourist attraction in Los Angeles. It is a major draw for Hollywood tourism, attracting millions of visitors each year. It spans 15 blocks of Hollywood Boulevard and three blocks of Vine Street and features over 2,700 five-pointed terrazzo and brass stars embedded in the sidewalk for individuals in the entertainment industry, such as in: motion pictures, television, recording, radio, and live theater/performance. However, it is not interactive, leading people to use their phones or other devices to discover information about the inductees. Thus exists the need for a new type of interactive experience with an application.

SUMMARY

In some aspects, the techniques described herein relate to a system for providing an interactive experience at an attraction, including: a server including at least one processor and a memory; a database coupled to the server storing digital content associated with celebrities; a computing device having a display, a camera, and a global positioning system (GPS) unit; an application executable on the computing device configured to: determine a location of the computing device using the GPS unit; detect when the computing device is within a predetermined distance of a designated physical location associated with a celebrity; activate an interactive session when the computing device is within the predetermined distance; and generate, in real-time, an artificial intelligence depiction of the celebrity.

In some aspects, the techniques described herein relate to a system, wherein the application is further configured to: capture, via the camera, images or videos of a user at the designated physical location; combine the artificial intelligence depiction of the celebrity with the captured images or videos to create a generated image or video; and display the generated image or video on the display of the computing device.

In some aspects, the techniques described herein relate to a system, wherein the combining of the artificial intelligence depiction of the celebrity is done in real time.

In some aspects, the techniques described herein relate to a system, wherein the combining of the artificial intelligence depiction of the celebrity is done for a previously captured image or video.

In some aspects, the techniques described herein relate to a system, wherein the digital content stored in the database includes: multiple poses of the celebrity; audio content associated with the celebrity; video content associated with the celebrity; and metadata describing characteristics of the celebrity.

In some aspects, the techniques described herein relate to a system, wherein the application is further configured to: present a user interface allowing the user to search for specific poses of the celebrity for insertion into the generated image or video.

In some aspects, the techniques described herein relate to a system, wherein the application is further configured to: present a user interface allowing the user to search for specific celebrities on a virtual map.

In some aspects, the techniques described herein relate to a system, wherein the application is further configured to: provide navigation directions to the physical location associated with a selected celebrity; and display available interactive experiences associated with the selected celebrity.

In some aspects, the techniques described herein relate to a system, wherein steps to create the generated image or video includes: analyzing the captured images to determine optimal positioning of the generated image or video.

In some aspects, the techniques described herein relate to a system, wherein steps to create the generated image or video includes: selecting appropriate lighting effects to enhance an appearance of the combined image.

In some aspects, the techniques described herein relate to a system, wherein steps to create the generated image or video includes: adjusting a scale and orientation of the generated image or video to match a captured environment.

In some aspects, the techniques described herein relate to a system, wherein the application is further configured to: authenticate users through a registration process; maintain user accounts with associated preferences and history; track user interactions with different celebrity locations; and provide rewards or incentives based on user engagement.

In some aspects, the techniques described herein relate to a system, wherein the predetermined distance is configurable based on: a density of a surrounding area; a type of the attraction; a number of users currently in a vicinity; and a specific requirements of the interactive experience.

In some aspects, the techniques described herein relate to a system, wherein the application supports: scheduled broadcast content; and pay-per-view access to premium content.

In some aspects, the techniques described herein relate to a system, wherein the application further supports interaction with multiple AI-generated celebrities simultaneously, allowing for: generation of scenes with multiple celebrities into the generated image or video; interaction between AI-generated celebrities; and creation of the generated image or video with the multiple celebrities.

In some aspects, the techniques described herein relate to a method for providing an interactive experience at an attraction, including: receiving, at a server, a location signal from a computing device; determining whether the computing device is within a predetermined distance of a designated physical location; activating an interactive session when a predetermined distance condition is met; receiving image data from a camera of the computing device; generating, using artificial intelligence, a real-time image of a celebrity associated with the designated physical location; combining the generated celebrity image with the received image data to create an augmented reality experience; and transmitting the augmented reality experience to the computing device for display.

In some aspects, the techniques described herein relate to a method, further including: providing a user interface for searching available celebrity experiences; displaying a virtual map showing locations of different celebrity experiences; tracking user interactions with different experiences; and storing interaction history in a database.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
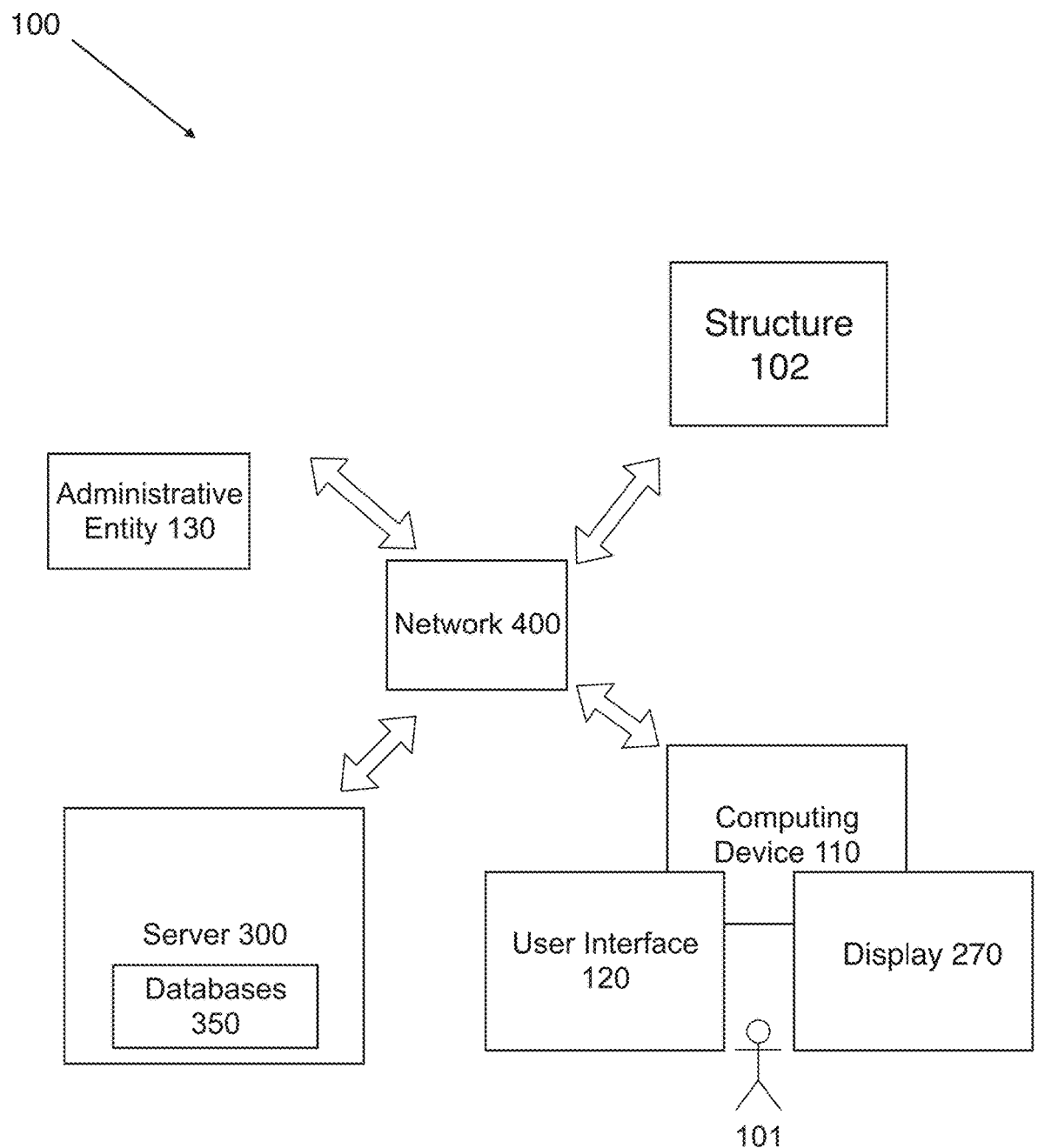
FIG. 1 illustrates the components of the interactive system.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment and, such references mean at least one of the embodiments.

References in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

The present invention is directed to an immersive experience for attractions such as the Hollywood Walk of Fame. The goal of the invention is to give tourists, fans, and visitors a more immersive and interactive experience while visiting the Walk of Fame. The artificial intelligence application would meet this goal by allowing users to download an app, locate their favorite celebrity's star via GPS, and activate an interactive session while standing near the star. The app would sync with the user's camera and generate a real-time artificial intelligence image of the celebrity (not post-editing), allowing users to pose with the image, switch between various approved versions of the celebrity, hear the AI celebrity speak, and capture photos or videos of the experience. While similar AI image generation apps exist, they have not been used in this way with celebrities, especially in real-time interaction at their physical Walk of Fame stars Referring initially to FIG. 1, one or more embodiments of interactive experience 100 in accordance with the present invention is illustrated. Interactive experience 100 is illustrated as a simplified block architecture diagram consistent with the embodiments of the present disclosure. Interactive experience 100 may include a structure 102 such as a panel, brick, stand, or other fixture positioned inside or above a surface such as a star at the Hollywood Walk of Fame and a computing device 110 operated by a user 101.

While described for the Hollywood Walk of Fame, the interactive experience 100 may be extended to other tourist attractions, museums, historical sites, and venues of cultural significance. For historical locations, the system may generate AI depictions of historical figures relevant to the site, providing educational context through interactive engagement. In museums, AI representations of artists could discuss their exhibited works, while at sports venues, legendary athletes might appear to discuss memorable games or achievements associated with the location.

Educational applications of the interactive experience system may include historical figures appearing at relevant landmarks, providing factual information about historical events, architectural features, or cultural contexts. Schools and educational institutions may utilize the system for immersive learning experiences, allowing students to interact with AI representations of historical figures, scientists, authors, or other notable individuals, thereby creating engaging educational content delivered through interactive technology.

Computing device 110 may be any type of user computing device that typically operates under the control of one or more operating systems which control scheduling of tasks and access to system resources. Computing devices 110 may be a phone, tablet, television, desktop computer, laptop computer, gaming system, wearable device electronic glasses, networked router, networked switch, networked, bridge, or any user computing device capable of executing instructions with sufficient processor power and memory capacity to perform operations of Interactive experience 100.

Computing device 110 may have a global positioning system (GPS) unit coupled to the circuitry to provide location information to the circuitry whereby the GPS may provide the location information related to any structures 102 whereby, based on the location of computing device 110, users may interact with virtual constructs related to structures 102.

In some embodiments, a graphical user interface 120 (GUI) may be accessed from computing devices 110. User interface 120 may be designed for providing user control input to a game process operated by a game engine executing on the processor. User interface 120 may have a plurality of buttons or icons that are selectable through user interface 120 for interactive experience 100 to perform particular processes in response to the selections. User interface 120 may include but is not limited to a heads-up display, title bars, toolbars, pull-down menus, tabs, scroll bars, content help, dialog boxes, operating buttons (icons), and status bar that the user navigates throughout the display.

Data stored in databases 350 may include: (1) data associated with the virtual world such as imagery data used to render the virtual world on a display device, geographic coordinates of locations in the virtual world, etc.; (2) data associated with users; (3) data associated with interactive experiences (e.g., data associated with experiences, status of game experiences, past experiences, future experiences, desired experiences, etc.); (4) data associated virtual elements in the virtual world (e.g., positions of virtual elements, types of virtual elements, experiences associated with virtual elements, corresponding actual world position information for virtual elements, behavior of virtual elements, relevance of virtual elements, etc.); (5) data associated with real world objects, landmarks, and positions linked to virtual world elements (e.g., location of real world objects/landmarks, description of real world objects/landmarks, relevance of virtual elements linked to real world objects, etc.); (6) Status (e.g., current number of users, current status of experiences), (7) data associated with user actions/input; and (8) any other data used, related to, or obtained during implementation of interactive experience 100.

In some non-limiting embodiments, computing devices 110 may be in communication with one or more servers, such as server 300 via one or more networks such as network 400. Server 300 may be located at a data center or any other location suitable for providing service to network 400 whereby server 300 may be in one central location or in many different locations in multiple arrangements. Server 300 may include a database server such as MySQL® or Maria DB® server. Server 300 may have an attached data storage system storing software applications and data.

Server 300 may include a front-end web server that is coupled to computing devices 110 and other devices via a network such as the Internet. The front-end web server may provide services, including ticketing and other non-essential services, and login services.

In some embodiments, server 300 may include a back-end web server that is coupled to a computing device 110 via the Internet. The back-end web server may be on the same network or the same machine as a database server. The database server may process and/or store customer and/or asset information.

Server 300 may have a number of modules that provide various functions related to interactive experience 100. Modules may be in the form of software or computer programs that interact with the operating system of server 300 whereby data collected in databases 350 as instruction-based expressions of components and/or processes may be processed by one or more processors within server 300 or another component of computing devices 110 as well as in conjunction with execution of one or more other computer programs. Modules may be configured to receive commands or requests from devices 110, server 300, and outside connected devices over network 400.

Server 300 may include storage for providing services to users 101 at connected user systems and managing the network accounts of users 101. Some or all of the resources and services provided by server 300 may be restricted. Server 300 controls access to these restricted resources and services so that only accounts with current proper credentials are permitted to access copied or cloned resources or services. Server 300 may create and manage accounts for users. Server 300 may be connected to and maintain an account database storing account information (e.g., information identifying the user for the account, the type of account, the current access level of the account, the permanent or default access level of the account, and the current user system for the account).

Server 300 may have a control module with appropriate firmware or software and an operating system to control overall operation and configuration of interactive experience 100. The controller module may be in operable communication with a network interface module which provides interface functionality over one or more networks (wired or wireless) and possibly connectivity with other communication media. The controller module may also be in communication with an audio module and a video module, which receive and process audio and video data, respectively, from one or more connected video cameras or other input devices for users 101 on computing devices 110.

The audio module may include other modules or components for processing audio data, speech detection and recognition modules and codecs for processing incoming or outgoing video data. A speech detection module can be configured to detect instances of speech at a site (for example, to trigger recording or other functions of interactive experience 100) and/or determine the relative physical location of the detected speech for use in controlling the operation of individual microphones on computing devices 110. Speech recognition may be used to distinguish between individual voices for the purpose of filtering out other voices.

The video module may include image recognition modules for use in detecting speech or distinguishing between announcers or other individuals, and appropriate codecs for use in processing incoming or outgoing video data. The audio and video modules may also include, respectively, interfaces for data communication between input units such as microphones and cameras, and output units such as speakers and display screens.

Database 350 represents a series of data that is managed by a database management system, also called electronic database, including video or audio related to the celebrity and are structured to facilitate the storage, retrieval, modification, and deletion of data in conjunction with various data-processing operations of various interactive programs. The database is an organized collection of data, generally stored and accessed electronically from various components connected over network 400. Database 350 may be physically or logically divided into one or more separate databases.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including a telecommunications network, a wireless network (including Wi-Fi), and a wireline network. Network 400 may include mobile telephone networks utilizing any protocol or protocols used to communicate among mobile digital computing devices (e.g., computing device 110), such as GSM, GPRS, UMTS, AMPS, TDMA, or CDMA. In one or more non-limiting embodiments, different types of data may be transmitted via network 400 via different protocols. In alternative embodiments, computing devices 110, may act as standalone devices or whereby they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices 110 if for instance they are in a remote location not accessible by other networks.

Computing devices 110 may communicate via network 400 to access various services for the interactive experience 100. It should be appreciated that multiple computing devices may receive the cloned virtual assets, all simultaneously or sequentially.

Figure 2:
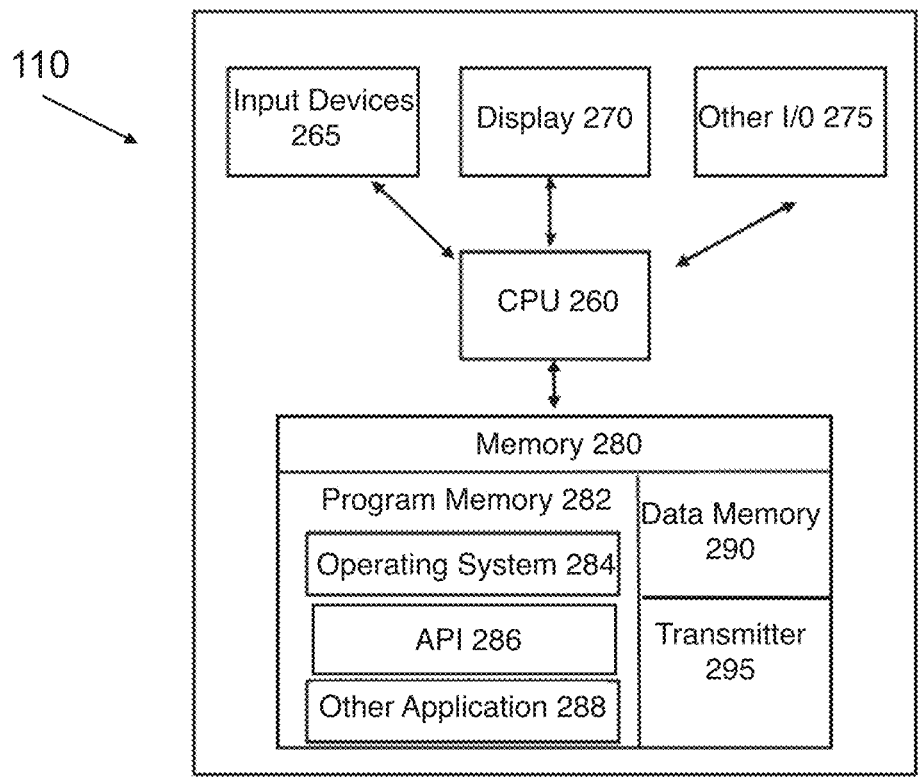
FIG. 2 illustrates a block diagram of the computing devices of the interactive system.

Turning to FIG. 2, FIG. 2 is a block diagram showing various components of a computing device 110. Computing device 110 may include a housing for holding one or more hardware components that allow access to edit and query interactive experience 100. Computing device 110 may include one or more input devices such as input devices 265 that provide input to a CPU (processor) such as CPU 260 of actions related to a user 101. Input devices 265 may be implemented as a controller, a joystick, a keyboard, a touchscreen, a mouse, via voice activation, wearable input device, a camera, a trackball, or a microphone.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen or an LED display screen. Display 270 may also include a touch screen interface operable to detect and receive touch input such as a tap or a swiping gesture.

Display 270 may be a binocular head mounted display (HMD), head mounted goggles (HMG), an augmented reality device, virtual reality glasses, a scope simulator, a hologram projector, a monocular simulator, a binoculars simulator, a telescope simulator, Google Glass™, or another form of device that is connectable to the computing device whereby users may view a virtual environment through the display. Interactive experience 100 may also use any latest video and audio rendering technologies to accomplish the goal of the present invention instead of or in combination with virtual reality or augmented reality.

In some embodiments, the computing device 110 may be capable of displaying an augmented reality view through a camera, sensor, or other method. The system may have a creation module that may be configured so that users 101 may interact with a virtual environment in an augmented reality view by inserting annotations, comments, virtual objects, pictures, audio, and video to locations within range of the event or the device. The virtual objects may include virtual characters or static virtual objects, and any other virtual objects that can be rendered by the augmented reality networking system. In some non-limiting embodiments, a celebrity who is verified and connected to interactive experience 100 through a computing device 110 may upload their own annotations such as their current thoughts, goals, pictures, videos, or motivational comments of which other users might read. In further embodiments users 101 may be presented a series of filters such that they may view all virtual objects or just those by the actual celebrity.

In one or more non-limiting embodiments, display 270 may be a mobile device or other device. The camera of a mobile device may capture video of the surrounding area so that user 101 may interact with the augmented reality view by inserting annotations, comments, virtual objects, pictures, audio, and video to locations within range of computing device 110. The virtual objects may include virtual characters, static virtual objects, and any other virtual objects that can be rendered by the augmented reality networking system built within the system.

In some embodiments, interactive display 270 may include a wearable such as Google Glass™ or another form of wearable device that is connectable to a computing device 110. A wearable device may be in the form of eyeglasses positioned above the nose having one or more user computing devices. Such eyeglasses (not shown) may have a small video screen and camera that connect wirelessly to server 300 or computing device 110.

Eyeglasses may be configured so that users 101 may interact with the augmented reality view by inserting annotations, comments, virtual objects, pictures, audio, and video, to locations within range of computing device 110. The virtual objects may include virtual characters or static virtual objects, and any other virtual objects that can be rendered by the augmented reality networking system built within interactive experience 100 These interactions may be viewed by other users 101 who may also build upon the interactions or make additional interactions that then may be seen by the original user or a third user.

Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may include random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data which may be provided to program memory 282 or any element of computing device 110.

Computing devices 110 may have one or more automations such as when a user 101 enters the predetermined range based on GPS or other location services, computing device 110 may activate a video playback module. The video playback module begins playing content on computing device 110 and ends when user 101 leaves the area or selects another selection through user interface 120.

Computing devices 110 may have a user tracking module that maintains a historical record of proximity detection events by the user which is stored in database 350. For example, the proximity detection events may include records of what proximity sensors, and how often these proximity detection events occurred for each computing device 110. The user tracking module may perform analytics on this information to derive any behavioral patterns of the user from which to generate targeted content for that user.

Users 101 may initially register to become a registered user 101 associated with interactive experience 100. Interactive experience 100 may be downloadable and installable on computing device 110. In one or more non-limiting embodiments, interactive experience 100 may be preinstalled on computing devices 110 by the manufacturer or designer. Further, interactive experience 100 may be implemented using a web browser via a browser extension or plugin. Server 300 may associate user computing devices 110 with an account during the registration process.

Figure 3:
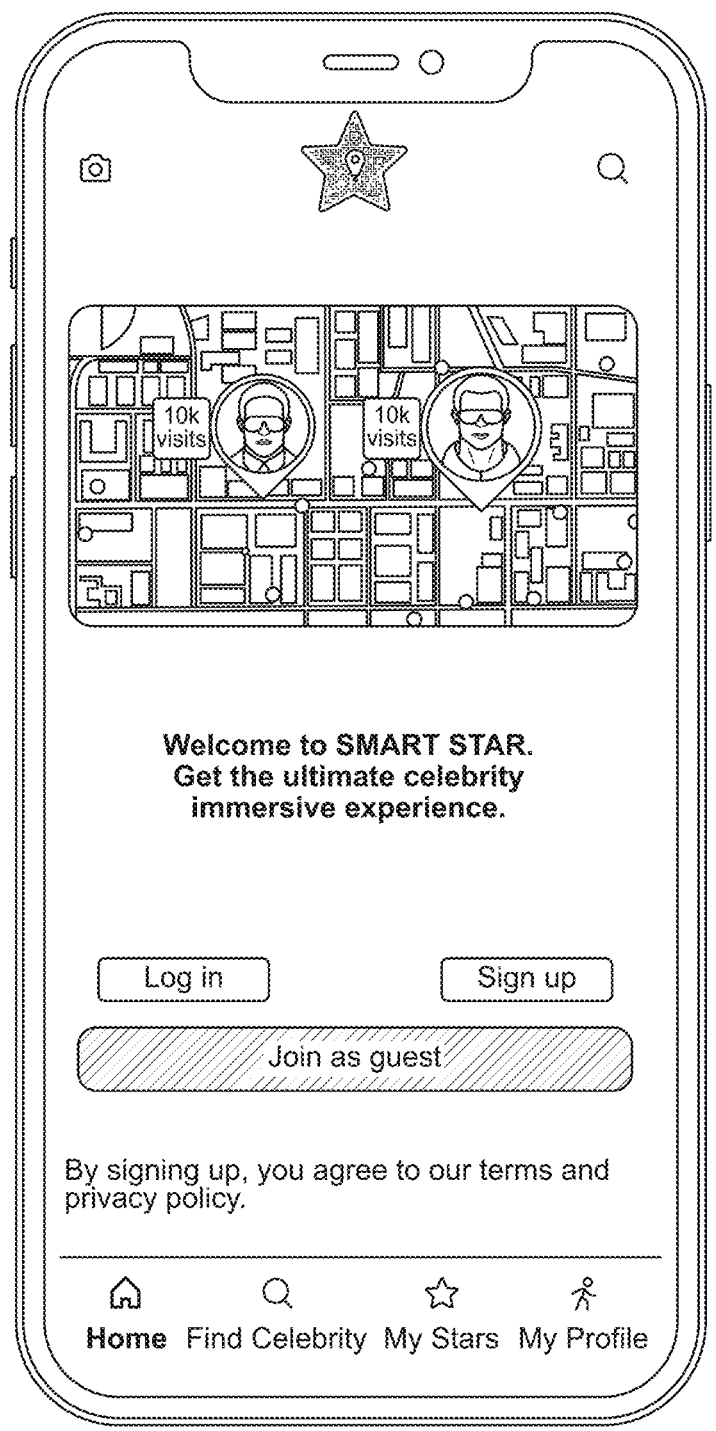
FIG. 3 illustrates the user interface of the interactive system.

Users 101 may interact with or check-in to any location such as an interactive experience at the Hollywood Walk of fame with user computing device 110 to receive these points, rewards, and trophies, as illustrated in FIG. 3. A "check-in" as used herein is self-reported positioning of users 101 at a physical place and sharing of their locations with their friends or other contacts through interactive experience 100. User's 101 "check-in" may also be recorded and uploaded to databases of server 300 whereby the "check-in" may be transmitted to other user computing devices 110 where user interface 120 displays the "check-in" of user 101 and recent activity of user 101 at the location. Server 300 may also store user's 101 "check-in" in databases 350 of server 300 for subsequent use and collection of information pertaining to user 101. In some non-limiting embodiments, user's 101 "check-in" is visible to user's 101 contacts and even other non-contact users depending on privacy settings, which may be set or modified by user 101 via the user interface 120.

The location may be determined directly by a variety of sensing components such as optical cameras and infrared (IR) cameras, global positioning system, compass, wireless networks, or Bluetooth. The location component may then determine location information of the user based on the received information from user computing device 110. The cameras may also determine the location based on how far the body and face of users 101 are from the camera.

In one or more non-limiting embodiments, users 101 may search for locations to interact with; user interface 120 may present to user 101 a search window whereby a search request having a character string may be entered where one or more locations may be identified using name, the type of business, or other metadata pertaining to a venue or other physical location.

Users 101 may input additional text or changes to the existing search request through user interface 120 to receive an updated list of locations based on the newly entered text. The search request may also include other parameters, such as categories, distance, and already visited locations. Further, in some embodiments, these parameters as well as others may be automatically factored in when a search request is conducted. User interface 120 may provide the ability to adjust and select parameters that may be used to filter and/or rank the results of the locations displayed to the users 101.

Server 300 may send a data request to user computing device 110 for identifying a geographic location of user computing device 110 or a network location of user computing device 110, as well as a timestamp identifying when the location was recognized. The geographic location may be any physical location, which may be expressed in longitudinal and latitudinal coordinates, and may include other dimensions and factors such as altitude or height for determining an exact position of the geographic location. Server 300 may gather location data from a GPS system, a triangularization system, a communications network system, or any other system on user computing device 110.

Server 300 may then determine whether users 101 are within a predetermined distance of the physical location in the interactive experience based the location of computing device 110. In a non-limiting embodiment, the distance may be 20 yards, but the distance may be greater or less depending on the location and the density of the area in which the experience is located. In other embodiments, a third-party location system may also be used instead of the GPS capability of the user computing device 110. If user 101 is not within the predefined distance, user 101 may be notified by server 300 through user interface 120 that they may not interact until they are closer to the physical location. In some embodiments, user 101 may only collect incentives and rewards within a predetermined amount of time to ensure the actual user is the one in the location.

Interactive experience 100 may present the location of users 101 who are a part of the system. The presentation may be in the form of a pop-up window displayed to each user or displayed on its own tab. Users 101 may be presented with a geo-spatial environment having a virtual map of the geographical location in which users 101 are located. The virtual map may have geography and topography, which parallels the geography and topography of the physical real world. For instance, a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be displayed with users 101 as markers, pins, or identifiers at their respective locations. Users' 101 position on the virtual map corresponds to their position in the real world.

User interface 120 allows users 101 to search on the virtual map for specific celebrities or experiences at locations designated as searchable on the map. User interface 120 may present to user 101 a search window whereby a search request having a character string may be entered where one or more locations may be identified using name, type of business, or other metadata pertaining to venue or other physical location.

When interacting with the digital map, users 101 may receive and submit requests for navigation directions (e.g., driving directions, walking directions, biking directions, etc.) to go from a starting location to a destination location. In submitting the navigation requests, the user 101 may specify various preferences such as requesting a route based on abilities such as if they are handicap or require an intermediate destination to receive equipment, tools, or other devices.

Once at a specific experience, users 101 may search for available capabilities such as video or audio content based on the specific structure 102 whereby the recorded video may be different or modified based on the selections of the users. The search may yield results of real time streaming content that is being broadcast live by user available content such as the celebrity connecting to the system with their computing device and uploading real time video or other notifications, archived or previously recorded content, or content that will be broadcasted at a designated time by a celebrity from their computing device such as for special events or interactive sessions with fans or any number of other events.

The elapsed viewing time may be displayed for the user to see. In some embodiments interactive experience 100 may employ a pay-per-view system whereby users 101 purchase tokens or other forms of currency, with each token representing a predetermined block of time or an amount of video or performances. Users 101 purchase tokens using a credit card over a secure credit card connection. The purchased tokens are credited or debited into an account a user may establish. The user may watch the selected content until the content ends, viewing time expires, or may exit at any time. The amount of revenue collected by interactive experience 100 may have a set distribution made to the celebrities. In further embodiments users 101 may select a plurality of celebrities to be displayed whereby they may interact with each other. Interactive experience 100 may direct the user to the next celebrity at a second structure 102 to repeat the process.

When interacting with an experience, interactive experience 100 may be visually augment real time images and videos of user 101 or other people or objects with virtual images to simulate realistic virtual images of the user interacting with a celebrity, athlete, or other individual or entity such as an animal. As an illustrative example, these virtual images can be used to enhance ordinary, plain photographs to appeal to users who are tourists or visiting the attraction. In some embodiments, user 101 may interact with multiple celebrities where they may do compatible poses.

Beyond static interactions, the interactive experience 100 may support narrative-driven experiences where users can participate in simulated scenarios with the AI celebrity. For example, users might conduct a virtual interview with the celebrity, recreate a famous scene from a movie, or engage in a simulated conversation about the celebrity's career highlights. These narrative experiences may be pre-scripted or dynamically generated based on user inputs and preferences.

Interactive experience 100 may utilize virtual object selection modules to select virtual objects to augment a first image by retrieving virtual objects from a virtual object database in databases 350. For example, an object analysis module may determine three-dimensional shapes and relative sizes of one or more virtual objects that can be employed to insert into a picture. In another example, a semantics pairing module can perform functions similar to a semantics tool to determine parameters for insertion based on respective pairings of virtual object. And in another example, a position analysis module can determine optimized positioning, placement, arrangement, orientation, or ordering of virtual objects that can fit in the one or more images. In some embodiments, a virtual lighting module adds lighting effects to enhance the appearance of the image. The virtual image processing system transmits selected virtual objects and the optional lighting elements to the image mixer.

Figure 4:
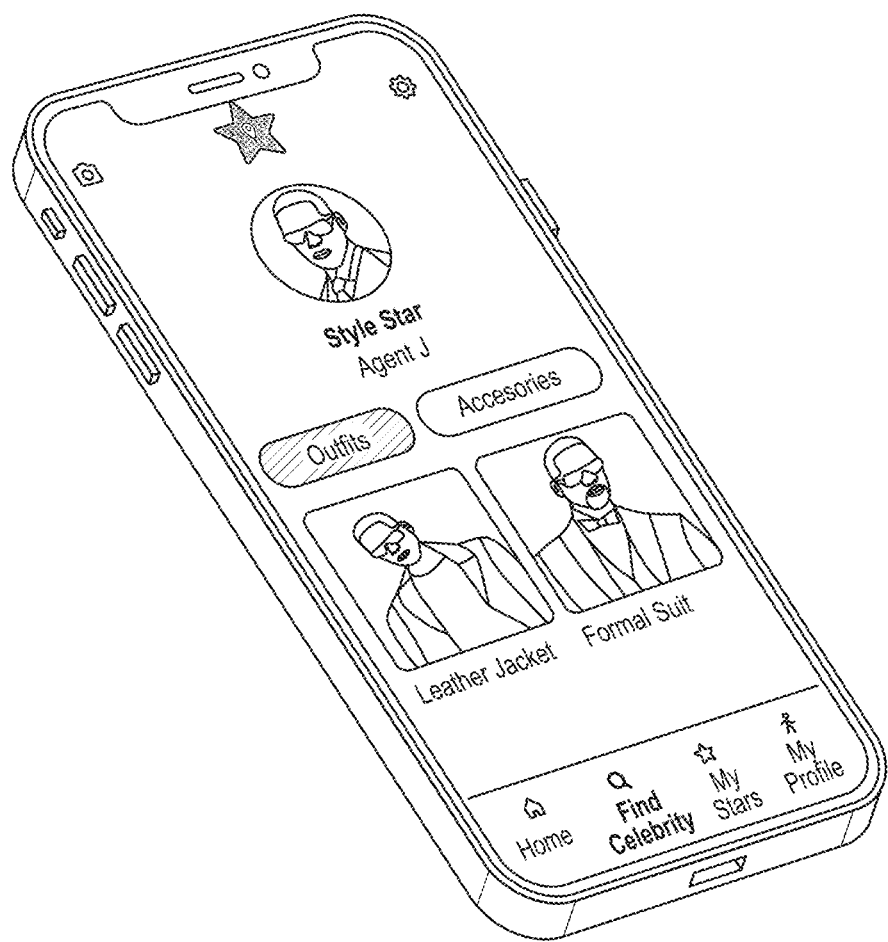
FIG. 4 illustrates another screen of the user interface of the interactive system.

The image mixer receives, from the virtual image processing system, the first picture with identification information of user 101 and their respective semantics, the selected virtual objects (selected automatically or manually), their respective virtual object semantics and pairings, and optional lighting elements. The image mixer combines the above-mentioned information to arrange and generate a second image depicting the virtual objects with user 101 of the first image. The image mixer outputs the generated second image to computing device 110. In further embodiments, user 101 may be presented a variety of options and poses of which may be used when inserting a celebrity or individual inside the picture, as illustrated in FIG. 4.

Figure 5:
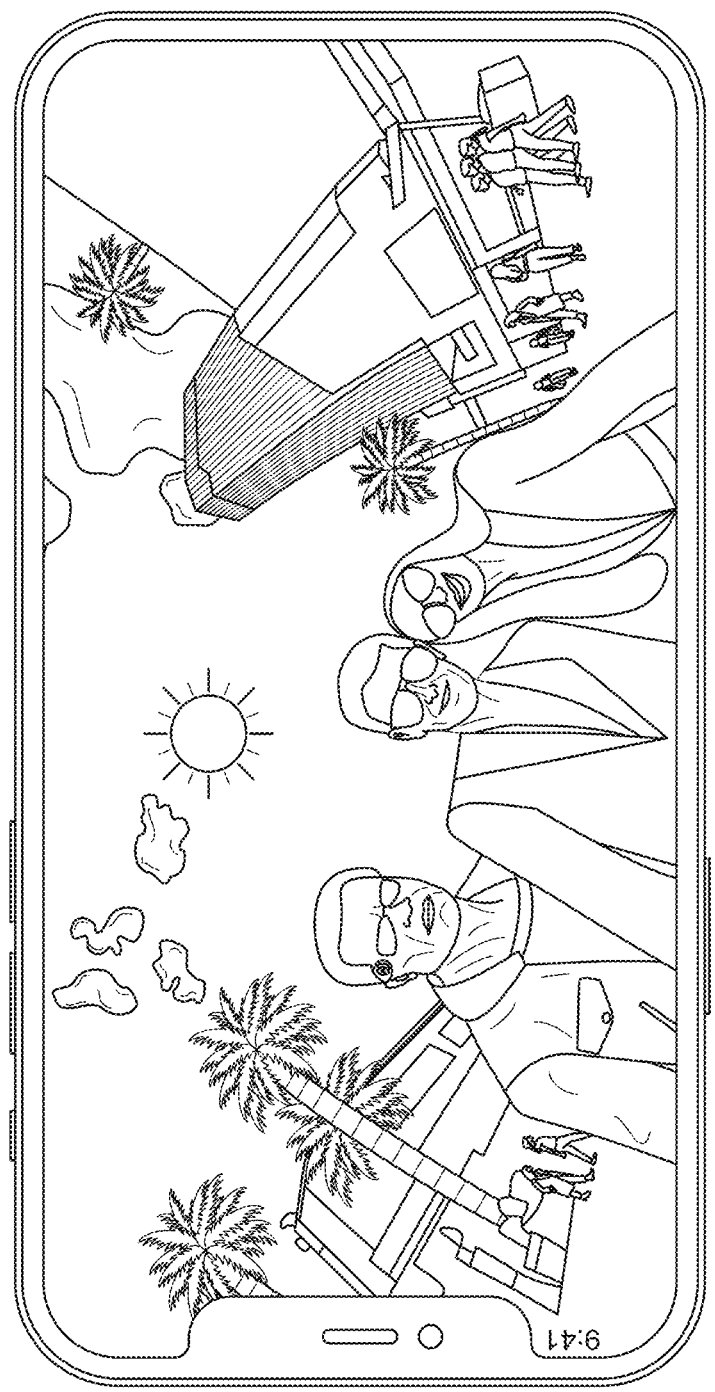
FIG. 5 illustrates a picture of the interactive system.
Figure 6:
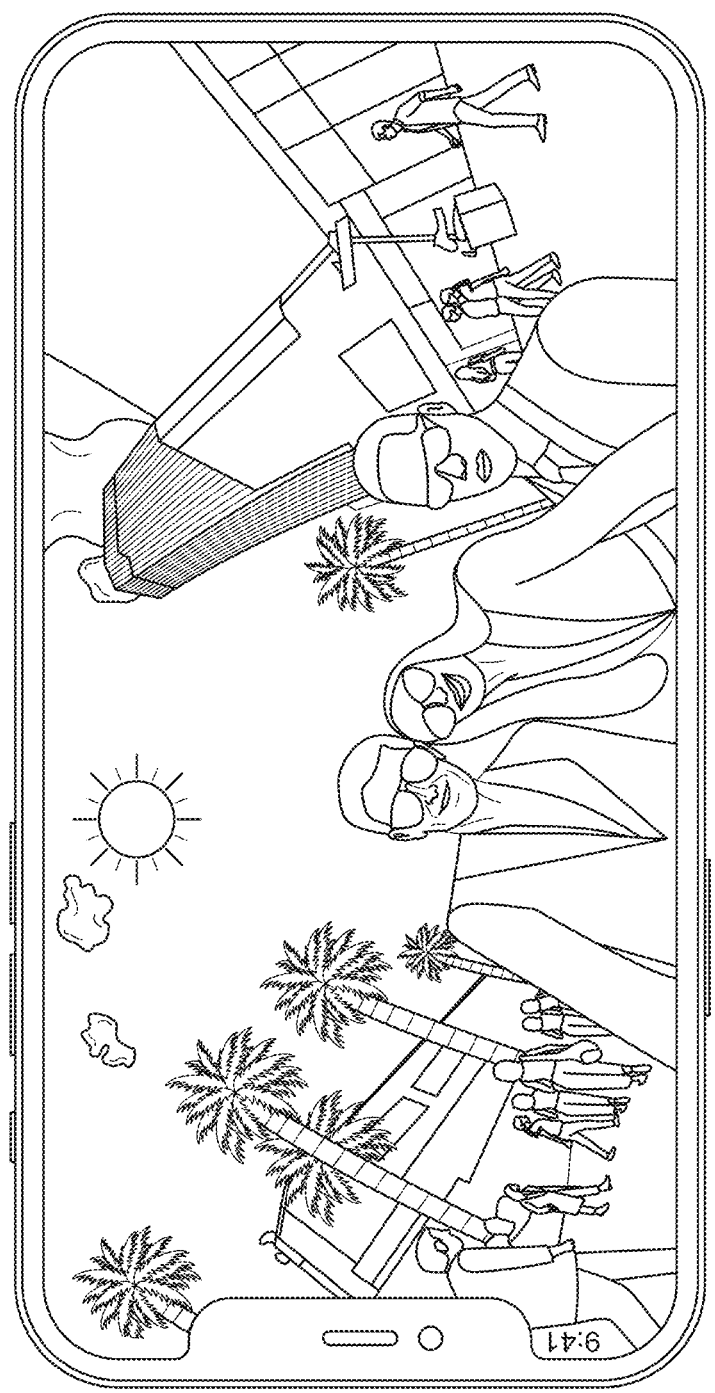
FIG. 6 illustrates another picture of the interactive system.

Interactive experience 100 may employ specialized deepfake technology, utilizing image generation systems. These systems generate images or videos based on a reference image of the celebrity, allowing for the integration of the celebrities' input image into simulated scenarios or events including captured images of user 101 at the physical location, as illustrated in FIGS. 5 and 6. During inference, a single reference image can produce an image resembling the captured image but now also featuring the celebrity. This simulated image is not a real photograph but a representation of the celebrity applied to the rendered target image, achieved by mapping features from the reference image onto the captured image.

Interactive experience 100 is trained to constrain generation of the output image based on the input image such that the output image appears to depict the celebrity using an input image. The image generator may be part of a generative adversarial network that is trained by concurrently training the generator to generate images and concurrently training a discriminator to determine whether images are real or not real, correspond to the image from the rendered version of the image, and correspond to the identity of the celebrity from the reference image.

As discussed, the image generation system receives content such as an input image (which may also be called a reference image). The image generation system generates an output image that may be displayed as an illustration. It should be appreciated that image may be used interchangeably with video whereby the system may generate both from an image. The image generation system is configured to generate the output image such that it appears to depict the celebrity who is depicted in the input image but with modifications made relative based on the captured image The input image may be a still image that shows a person. The celebrity who is depicted in the input image may be referred to herein as the subject of the input image. The input image may be encoded in any suitable format and color space that allow interpretation of the input image by the image generation system. In some implementations, one or more still image frames are used as the input image. In some implementations, one or more video frames are used as the input image.

The captured image or video is also an input to the image generation system that describes a target situation or event to be shown in the output image along with previous training data. The output image may be a still image that shows a synthetic image of the celebrity who appears to be the subject in the captured image. The output image is generated based on the input image and such that the subject of the input image is depicted in accordance with the chosen pose or outfit. The output image may be a digital image composed of pixels arranged in a grid. The output image may be encoded in any suitable format and color space. In some implementations, multiple still images or video frames are generated as outputs by the image generation system.

The image generation system operates as a machine learning-based platform, utilizing input images to produce the output image. This system employs neural networks, interconnected units that process inputs and generate outputs based on activation functions. For instance, neurons within the network can detect specific features within an image and respond accordingly.

Similarly, the system analyzes audio samples from celebrities, employing voice recognition and generation algorithms to replicate voices. By assessing parameters like pitch, tone, and tempo, the AI extracts unique vocal characteristics, which are then utilized by an audio generator training system akin to the image generation system. With further training and refinement, the synthesized voice quality improves, capturing the nuances of celebrities voices more accurately.

Using speech recognition and natural language processing, the system can enable users to ask questions to the AI celebrity, who responds with contextually appropriate answers based on publicly known information, interviews, and documented statements by the actual celebrity. This creates a conversational dimension to the experience, allowing for a more personal and interactive engagement between the user and the AI representation.

During training, the network's 400 behavior is established through iterations, adjusting connection strengths (weights) between neurons based on discrepancies between output and expected results (ground truth). Through repeated iterations, the network converges to produce outputs consistent with the ground truth. Once training is complete, the network's weights remain constant, ensuring consistent performance. This system adopts a generative adversarial network (GAN) framework, where a generator produces synthetic images, a discriminator distinguishes real from synthetic images, and both are iteratively trained based on their performance. The image generation training system utilizes training data and employs a machine learning model, like a neural network, within the image generation system. This system aims to produce an output image such that it appears the celebrity is actually in the captured image.

The discriminators within the image generation training system include an identity-based discriminator, a realism-based discriminator, and a scene adjustment discriminator. The identity-based discriminator assesses whether the subject in the generated image matches the one in the input image. It distinguishes correct results when depicting the same person and evaluates the realism-based discriminator to distinguish real from synthetic images.

The realism-based discriminator evaluates the authenticity of the generated image determining whether it resembles a real or synthetic image. Correct classification as a real image is desired for the generator's performance. Both discriminators are trained iteratively with feedback from the training process to refine the image generation system.

In the described approach, the realism-based discriminator can be realized as a GAN discriminator, providing realism evaluations on a per-image basis. Alternatively, a Patch GAN discriminator can be employed, dividing the image into overlapping patches and assessing realism at the patch level. This approach enables fine-grained determinations of correctness or incorrectness for training the image generation system. During use, the deepfake is created until it has reached an adequate result such that the outputted image will appear realistic. This visualization occurs via the display on the computing device in real time or for pre captured or recorded images.

To enhance realism and environmental integration, interactive experience 100 may further incorporate depth sensing and environmental mapping technologies. These capabilities would allow the AI-generated celebrity to appear to interact with physical objects in the scene, such as sitting on nearby benches, leaning against walls, or walking around physical obstacles. This environmental awareness would significantly enhance the perceived realism of the augmented reality experience by respecting spatial relationships between the virtual celebrity and the physical world.

In some embodiments, the interactive experience system may be extended to incorporate wearable augmented reality (AR) glasses, providing users with a hands-free immersive experience. Such wearable integration would allow users to view and interact with AI-generated celebrities without the need to hold their computing device, creating a more natural and engaging interaction. The wearable devices may communicate with the computing device via Bluetooth or other wireless technologies, receiving processed AI depictions and displaying them directly in the user's field of vision.

Interactive experience system may incorporate commercial extensions such as virtual merchandise purchases within the application. Users may acquire digital memorabilia such as AI-generated autographed photos, exclusive video content featuring the AI celebrity, or premium interactive experiences.

The system may implement advanced gesture recognition capabilities, allowing for more natural interactions between users and AI-generated celebrities. By analyzing user movements captured through the computing device's camera, the system may enable users to high-five, shake hands with, or perform other physical interactions with the AI celebrity, with the AI representation responding appropriately to these gestures.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

What is claimed:

1. A system for providing an interactive experience at an attraction, comprising: a server comprising at least one processor and a memory; a database coupled to the server storing digital content associated with one or more celebrities; a computing device having a display, a camera, and a location system; and an application executable on the computing device configured to:
   determine a location of the computing device using the location system;
   detect when the computing device is within a predetermined distance of a designated physical location associated with a celebrity of the one or more celebrities;
   activate an interactive session when the computing device is within the predetermined distance; and
   generate, in real-time, an artificial intelligence depiction of the celebrity, wherein the digital content stored in the database comprises: multiple poses of the celebrity; audio content associated with the celebrity; video content associated with the celebrity; and metadata describing characteristics of the celebrity.

2. A system for providing an interactive experience at an attraction, comprising: a server comprising at least one processor and a memory; a database coupled to the server storing digital content associated with one or more celebrities; a computing device having a display, a camera, and a location system; and an application executable on the computing device configured to:
   determine a location of the computing device using the location system;
   detect when the computing device is within a predetermined distance of a designated physical location associated with a celebrity of the one or more celebrities;
   activate an interactive session when the computing device is within the predetermined distance;
   generate, in real-time, an artificial intelligence depiction of the celebrity;
   capture, via the camera, images or videos of a user at the designated physical location;
   combine the artificial intelligence depiction of the celebrity with the captured images or videos to create a generated image or video;
   display the generated image or video on the display of the computing device; and
   present a user interface allowing the user to search for specific poses of the celebrity for insertion into the generated image or video.

3. A system for providing an interactive experience at an attraction, comprising: a server comprising at least one processor and a memory; a database coupled to the server storing digital content associated with one or more celebrities; a computing device having a display, a camera, and a location system; and an application executable on the computing device configured to:
   determine a location of the computing device using the location system;
   detect when the computing device is within a predetermined distance of a designated physical location associated with a celebrity of the one or more celebrities;
   activate an interactive session when the computing device is within the predetermined distance; and
   generate, in real-time, an artificial intelligence depiction of the celebrity; and
   present a user interface allowing a user to search for specific celebrities on a virtual map.

4. A system for providing an interactive experience at an attraction, comprising: a server comprising at least one processor and a memory;
   a database coupled to the server storing digital content associated with one or more celebrities; a computing device having a display, a camera, and a location system; and an application executable on the computing device configured to:
   determine a location of the computing device using the location system;
   detect when the computing device is within a predetermined distance of a designated physical location associated with a celebrity of the one or more celebrities;
   activate an interactive session when the computing device is within the predetermined distance; and
   generate, in real-time, an artificial intelligence depiction of the celebrity, wherein the application is further configured to: authenticate users through a registration process; maintain user accounts with associated preferences and history; track user interactions with different celebrity locations; and provide rewards or incentives based on user engagement.

5. A system for providing an interactive experience at an attraction, comprising: a server comprising at least one processor and a memory; a database coupled to the server storing digital content associated with one or more celebrities; a computing device having a display, a camera, and a location system; and an application executable on the computing device configured to:
   determine a location of the computing device using the location system
   detect when the computing device is within a predetermined distance of a designated physical location associated with a celebrity of the one or more celebrities;
   activate an interactive session when the computing device is within the predetermined distance; and
   generate, in real-time, an artificial intelligence depiction of the celebrity, wherein the predetermined distance is configurable based on: a density of a surrounding area; a type of the attraction; a number of users currently in a vicinity; and specific requirements of the interactive experience.

6. A system for providing an interactive experience at an attraction, comprising: a server comprising at least one processor and a memory; a database coupled to the server storing digital content associated with one or more celebrities; a computing device having a display, a camera, and a location system; and an application executable on the computing device configured to:
   determine a location of the computing device using the location system;
   detect when the computing device is within a predetermined distance of a designated physical location associated with a celebrity of the one or more celebrities;
   activate an interactive session when the computing device is within the predetermined distance; and
   generate, in real-time, an artificial intelligence depiction of the celebrity;

capture, via the camera, images or videos of a user at the designated physical location;

combine the artificial intelligence depiction of the celebrity with the captured images or videos to create a generated image or video;

display the generated image or video on the display of the computing device, wherein the application further supports interaction with multiple AI-generated celebrities simultaneously, allowing for: generation of scenes with multiple celebrities into the generated image or video; interaction with multiple AI-generated celebrities; and creation of the generated image or video with the multiple celebrities.

7. A method for providing an interactive experience at an attraction, comprising:

receiving, at a server, a location signal from a computing device;

determining whether the computing device is within a predetermined distance of a designated physical location;

activating an interactive session when a predetermined distance condition is met;

receiving image data from a camera of the computing device;

generating, using artificial intelligence, a real-time image of a celebrity associated with the designated physical location;

combining the generated celebrity image with the received image data to create an augmented reality experience; and transmitting the augmented reality experience to the computing device for display;

providing a user interface for searching available celebrity experiences;

displaying a virtual map showing locations of different celebrity experiences;

tracking user interactions with different experiences; and storing interaction history in a database.

8. A system for providing an interactive experience at an attraction, comprising: a server comprising at least one processor and a memory; a database coupled to the server storing digital content associated with celebrities; a computing device having a display, a camera, and a location system; and an application executable on the computing device configured to:

determine a location of the computing device using the location system;

detect when the computing device is within a predetermined distance of a designated physical location associated with a celebrity;

activate an interactive session when the computing device is within the predetermined distance;

generate, in real-time, an artificial intelligence depiction of the celebrity, wherein the digital content stored in the database comprises: multiple poses of the celebrity; audio content associated with the celebrity; video content associated with the celebrity; and metadata describing characteristics of the celebrity;

capture, via the camera, images or videos of a user at the designated physical location;

combine the artificial intelligence depiction of the celebrity with the captured images or videos to create a generated image or video using environmental mapping such that the celebrity appears to interact with physical objects at the designated physical location; and display the generated image or video on the display of the computing device.

\* \* \* \* \*